US009361061B2

(12) United States Patent  
Marx et al.

(10) Patent No.: US 9,361,061 B2  
(45) Date of Patent: Jun. 7, 2016

(54) ELECTRONIC RETAIL SHELF PRICING AND PROMOTIONAL DISPLAY MODULAR SYSTEM

(75) Inventors: David L. Marx, Fort Worth, TX (US); Craig M. Sinclair, Lake Forest, IL (US)

(73) Assignee: THE SINCLAIR GROUP, INC., Lake Forest, IL (US)

( * ) Notice: Subject to any disclaimer, the term of this patent is extended or adjusted under 35 U.S.C. 154(b) by 908 days.

(21) Appl. No.: 13/294,282

(22) Filed: Nov. 11, 2011

(65) Prior Publication Data

US 2012/0120327 A1   May 17, 2012

Related U.S. Application Data

(60) Provisional application No. 61/413,156, filed on Nov. 12, 2010.

(51) Int. Cl.
| | | |
|---|---|---|
| H04N 5/64 | (2006.01) | |
| G06F 3/147 | (2006.01) | |
| G06Q 30/02 | (2012.01) | |

(52) U.S. Cl.
CPC .............. G06F 3/147 (2013.01); G06Q 30/02 (2013.01); *G09G 2380/04* (2013.01)

(58) Field of Classification Search
CPC ... B62B 3/1408; G06F 1/1637; G06F 3/1446; G06F 3/1423
USPC .................... 348/840; 235/383, 385; 345/1.3; 340/9.1; 705/16, 28
See application file for complete search history.

(56) References Cited

U.S. PATENT DOCUMENTS

| | | | |
|---|---|---|---|
| 4,521,677 A | 6/1985 | Sarwin | |
| 5,467,474 A | 11/1995 | Ackerman et al. | |
| 5,537,312 A | 7/1996 | Sekiguchi et al. | |
| 5,632,010 A | 5/1997 | Briechle et al. | |
| 5,736,967 A | 4/1998 | Kayser et al. | |
| 6,243,690 B1 | 6/2001 | Adamec et al. | |
| 6,550,673 B2 | 4/2003 | Massaro | |
| 6,624,757 B1* | 9/2003 | Johnson | G06K 17/0022 340/5.91 |
| 6,749,116 B2 | 6/2004 | Massaro | |
| 6,844,821 B2 | 1/2005 | Swartzel et al. | |
| 7,152,040 B1 | 12/2006 | Hawthorne et al. | |
| 7,287,001 B1* | 10/2007 | Falls | G06Q 10/087 235/383 |
| 7,392,948 B2 | 7/2008 | Smith et al. | |
| 7,520,429 B2 | 4/2009 | Koster | |
| 2003/0182193 A1* | 9/2003 | Kawamata | G06K 17/00 705/16 |
| 2003/0189529 A1* | 10/2003 | Martinez | G06F 1/1601 345/1.3 |

(Continued)

FOREIGN PATENT DOCUMENTS

| | | |
|---|---|---|
| GB | 2347296 | 8/2000 |
| GB | 2430535 | 3/2007 |
| JP | 11242452 | 9/1999 |

OTHER PUBLICATIONS

U.S. Appl. No. 13/943,616, Sinclair, C., filed Jul. 16, 2013.
U.S. Appl. No. 13/943,602, Sinclair, C., filed Jul. 16, 2013.

*Primary Examiner* — William C Vaughn, Jr.
*Assistant Examiner* — Naod Belai
(74) *Attorney, Agent, or Firm* — Marshall, Gerstein & Borun LLP; Randall G. Rueth

(57) ABSTRACT

There is provided an electronic display system for retail product displays including an electronic display apparatus, a controller, a database stored plan-o-gram data and associated devices.

20 Claims, 2 Drawing Sheets

(56) References Cited

U.S. PATENT DOCUMENTS

2007/0279315 A1* 12/2007 Laves .................. G06F 1/1615
                                                                               345/1.1

2008/0255894 A1* 10/2008 Falls ................... G06Q 10/087
                                                                              705/400

* cited by examiner

ELECTRONIC RETAIL SHELF PRICING AND PROMOTIONAL DISPLAY MODULAR SYSTEM

IDENTIFICATION OF RELATED APPLICATIONS

This patent application claims priority to U.S. Provisional Patent Application No. 61/413,156, filed on Nov. 12, 2010, entitled "Electronic Retail Shelf Pricing and Promotional Display Modular System," which patent application is hereby incorporated herein by reference in its entirety.

BACKGROUND OF THE INVENTION

Field of the Invention

The present invention relates to retail product pricing and promotion, more particularly to a modular electronic retail shelf pricing and promotional display system.

In retail marketing, for example grocery stores, drug stores, and mass merchants, paper stripes containing price and product information are typically placed along the edge of shelves on store gondolas. Such paper strips typically convey the price of an item, a short product description, and often display information that is required by law such as unit cost of an item to the consumer. Such paper strips typically are overlaid with different colored strips or with larger additional signs that call out when an item for sale is new, on sale, being discontinued, or such similar information.

From time to time, such paper strips, typically in three to four foot lengths, must be changed because of remodeling in the store or replacement of product gondolas or realignment of product lines. Such activity, is expensive for the merchant because of the required personnel handling such paper strip replacement and the possibility of misplacement of strips relative to products located on the shelves of the gondola.

Electronic product information display systems of a variety of types are known in the art. Such electronic display devices are typically a single display strip spanning the entire shelf length of a retail product shelf. Although the displays can be configured to match the length of shelf space occupied by a corresponding product such display systems are limited to the discrete length of the display strip itself. The information is typically static as to the product placement until replaced with new information. The display strips on a given shelf, if more than one, typically are not connected to each other for purposes of continuous dynamic display along the contiguous strips.

The apparatus of the present system must also be of construction which is both durable and long lasting, and it should also require little or no maintenance to be provided by the user throughout its operating lifetime. In order to enhance the market appeal of the apparatus of the present system, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

There is provided an electronic display system for retail product displays including an electronic display apparatus, a controller, a database stored plan-o-gram data and associated devices.

The electronic display apparatus includes an electronic display module mounted on a shelf edge of a shelf. The display module includes a display screen extending over the entire facing surface of the display module. A male connector is mounted on one end of the electronic display module and is electrically coupled to the display screen. A female connector is mounted on another end of the electronic display module and is electrically coupled to the display screen.

At least one additional electronic display module is mounted on the shelf edge of the shelf adjacent to the other electronic display module. A male connector of the additional electronic display module engages a female connector of the other electronic display module such that the display screens of each electronic display module defines a continuous display screen along the entire facing surface area of the two display modules.

The controller is coupled to the electronic display apparatus. The controller, for example a computer, or a microprocessor, is operable for communication with each electronic display module and provides electric power and display data to each electronic display module mounted on the gondola. The database of stored plan-o-gram data is stored on a plan-o-gram database device. The database of stored plan-o-gram data includes placement information of the specific products on the shelves of the gondola. The plan-o-gram database device is coupled to the controller and the controller accesses the database stored on the device. The controller provides exact positioning of product shelf location to at least one of the electronic display modules for display of such product information, for example price or coupon promotional information, on the display screen of such electronic display module. The controller also selectively provides video clips related to specific product or store promotions.

The electronic display system may also include a point-of-sale database stored on a point-of-sale database device which is coupled to the controller. The controller provides exact price information of product to at least one of the electronic display modules for display of such product price information on the display screen of such electronic display module. Such pricing information corresponds to the specific product shelf location obtained from the plan-o-gram data accessed by the controller.

The electronic display system may also include product inventory data stored in the point-of-sale database and the plan-o-gram database. The product inventory data that changes, from time to time, is communicated to the controller and can be communicated in real time as product is processed by a checkout scanner at a point-of-sale of the product. The product inventory data may also be used to indicate when a product 50 on the shelf 36 runs low or is out of stock, the retail store owner may substitute another product 50 for sale or lower the price of the product if it is not selling well or is a close-out item.

The electronic display system may also be a part of a network. The network couples the controller, the plan-o-gram database and point-of-sale database and updates product information in one of the controller, plan-o-gram database, and point-of-sale database. The network can be a local network within a specific store or it may be part of a network that connects a plurality of stores selling the same products.

The electronic display apparatus includes an electronic display module mounted on a gondola. The display module includes a display screen extending over the entire facing surface of the display module. A male connector is mounted on one end of the electronic display module and is electrically coupled to the display screen. A female connector is mounted on another end of the electronic display module and is electrically coupled to the display screen. In one embodiment the display module is mounted on a shelf edge of a shelf of the gondola. In another embodiment the display module is mounted vertically on an end cap of the gondola.

At least one additional electronic display module is coupled to the other electronic display module. A male connector of the additional electronic display module engages a female connector of the other electronic display module such that the display screens of each electronic display module defines a continuous display screen along the entire facing surface area of the two display modules.

The controller is coupled to the electronic display apparatus. The controller, for example a computer, or a microprocessor, is operable for communication with each electronic display module and provides electric power and display data to each electronic display module mounted on the gondola. The database of stored plan-o-gram data is stored on a plan-o-gram database device. The database of stored plan-o-gram data includes placement information of the specific products on the shelves of the gondola. The plan-o-gram database device is coupled to the controller and the controller accesses the database stored on the device. The controller provides exact positioning of product shelf location to at least one of the electronic display modules for display of such product information, for example price or coupon promotional information, on the display screen of such electronic display module. The controller also selectively provides video clips related to specific product or store promotions.

The electronic display system may also include a point-of-sale database stored on a point-of-sale database device which is coupled to the controller. The controller provides exact price information of product to at least one of the electronic display modules for display of such product price information on the display screen of such electronic display module. Such pricing information corresponds to the specific product shelf location obtained from the plan-o-gram data accessed by the controller.

The electronic display system may also include product inventory data stored in the point-of-sale database and the plan-o-gram database. The product inventory data that changes, from time to time, is communicated to the controller and can be communicated in real time as product is processed by a checkout scanner at a point-of-sale of the product. The product inventory data may also be used to indicate when a product 50 on the shelf 36 runs low or is out of stock, the retail store owner may substitute another product 50 for sale or lower the price of the product if it is not selling well or is a close-out item.

The electronic display system may also be a part of a network. The network couples the controller, the plan-o-gram database and point-of-sale database and updates product information in one of the controller, plan-o-gram database, and point-of-sale database. The network can be a local network within a specific store or it may be part of a network that connects a plurality of stores selling the same products.

There is also provided a method of promoting retail products on a shelf in a retail store. The method includes attaching a first electronic display module to a shelf edge. A second electronic display module is attached to the shelf edge immediately adjacent to the first electronic display module. An end of each display module is coupled together, wherein the display modules are in electrical communication with each other and wherein the display screen extending over the entire facing surface of each display module defines a continuous display screen along the entire facing surface area of the attached display modules. The controller is coupled to each display module. A controller is operable for communication with each electronic display module, wherein electric power and display data is provided to each electronic display module. The display data includes the exact position of product shelf location for at least one of the electronic display modules for display of such product information on the display screen of such electronic display modules for a specific product.

The method of promoting retail products on the shelf further includes coupling a plan-o-gram database and a point-of-sale database to the controller. The controller provides exact price of product to at least one of the electronic display modules for display of such product price information on the display screen of such electronic display module corresponding to the specific product shelf location. Such exact price of product is obtained from one or both of the attached databases.

The method of promoting retail products on a shelf further includes coupling the controller to a network. The network updates the product information in one of the controller, the plan-o-gram database, and the point-of-sale database.

DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION OF THE EXEMPLARY EMBODIMENTS

An electronic display system 10 is configured to replace paper, mylar, or similar substrate composed strips found on the edge of shelves in food, grocery and mass merchandising stores. Currently, paper-based systems require retailers to preprint product item descriptions, pricing, unit pricing, bar codes, and related information on paper strips found along the front of the shelf adjacent to the related product. Paper-based systems require the cost of preprinting and shipping each strip; the labor cost of searching for correct location of the item in the store, and installing the strip; the cost of changing out the strip as the price, product, or location of the product on the shelf changes. The cash flow costs of making late/missing price changes or incurring the cost of government sanctions or incorrect pricing information is a cost that merchandisers and business owners try to avoid. It is also the current practice of retailers to overlay multiple strips or other paper signs on top of the shelf strips. Such practice is referred to as "shingling."

Figure 1:
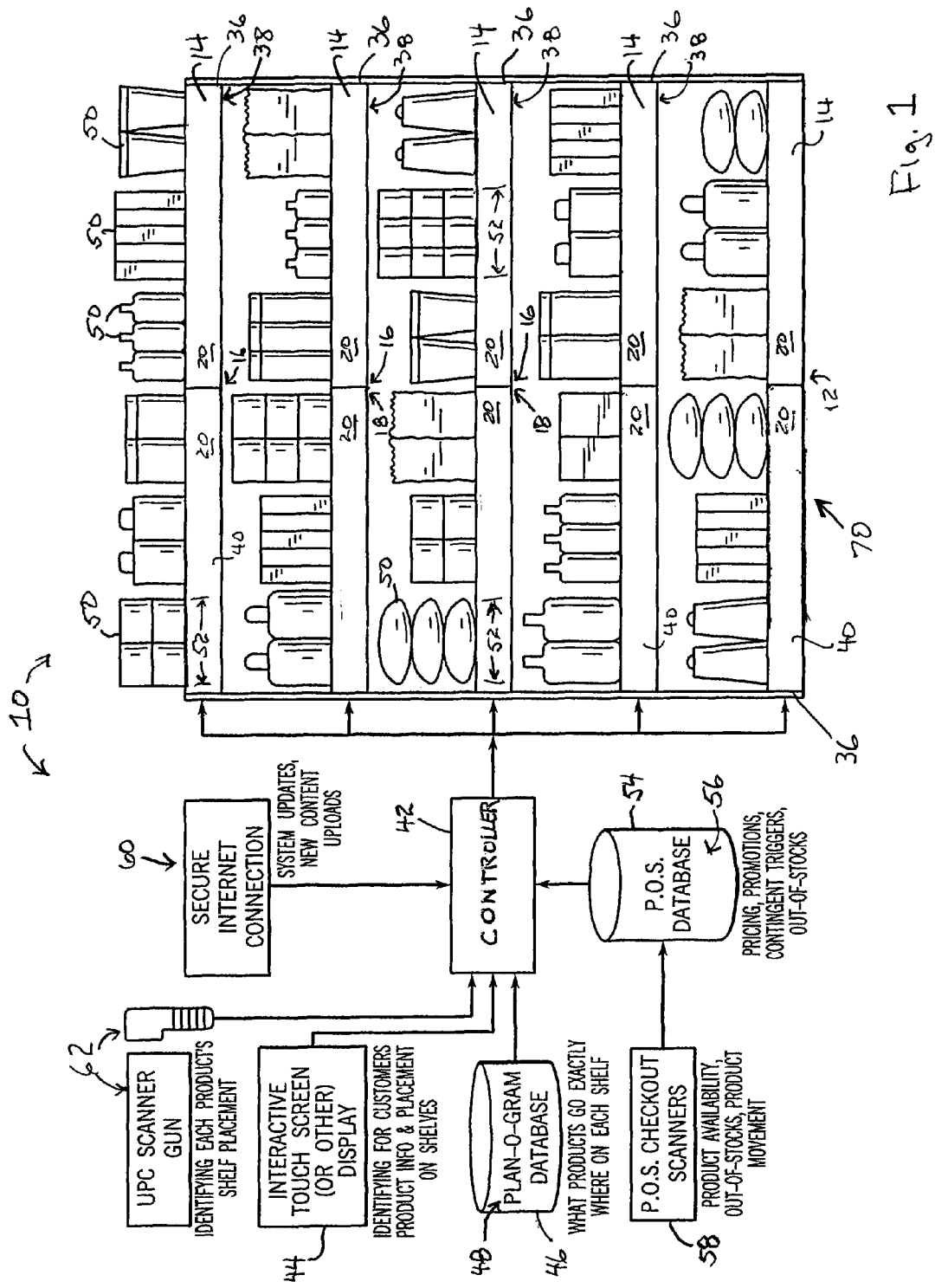
FIG. 1 is a schematic illustration of an exemplary embodiment of an electronic retail shelf pricing and promotional display modular system including a multi-shelf gondola with each shelf supporting products and with each shelf having two electronic display modules configured as an electronic display apparatus coupled to an edge of a shelf.
Figure 2:
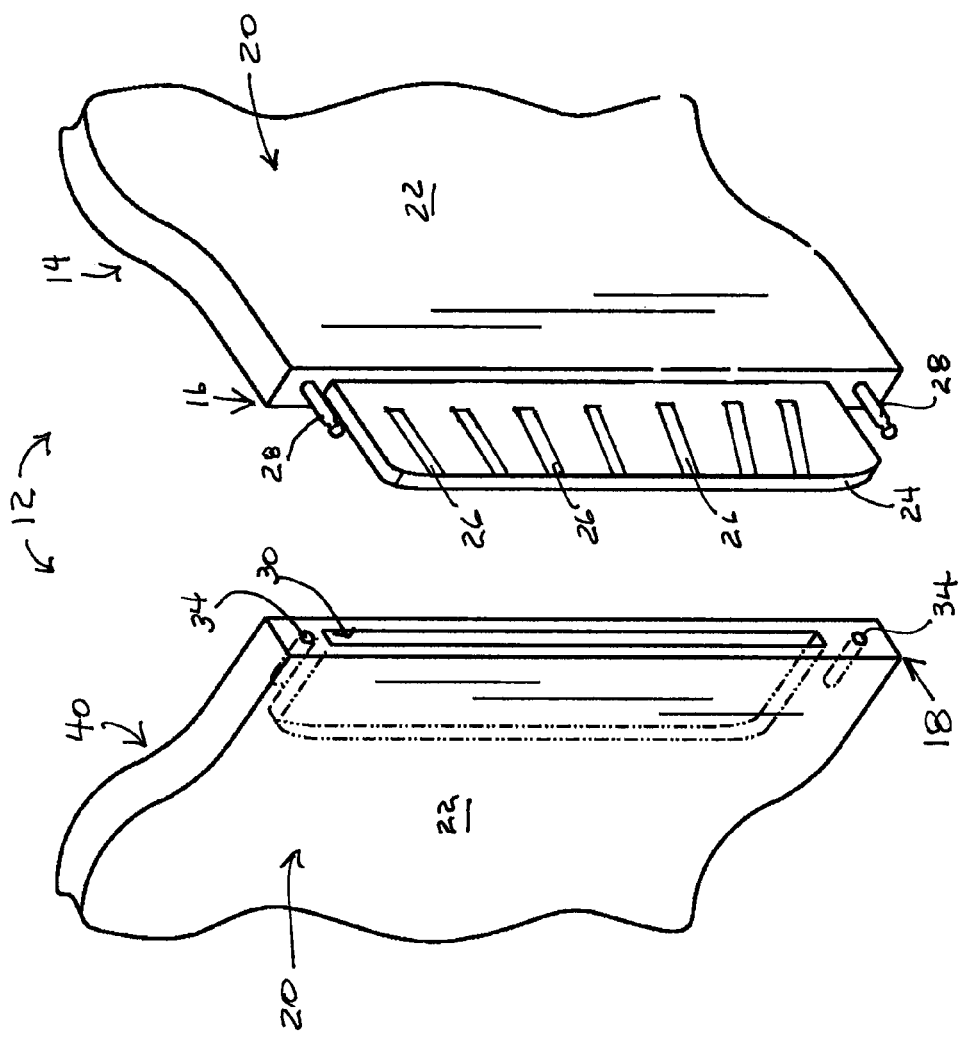
FIG. 2 is a partial perspective view of two electronic display modules of FIG. 1, illustrating a male and female connector defined on an end of each display module prior to connecting the two modules as a continuous display screen along the entire surface area of the two display modules.

Referring to the FIGS. 1-2, the electronic display system 10 of the present disclosure, includes an electronic display apparatus 12, a controller 42 and databases such as a plan-o-gram database 48 and a point-of-sale database 52 (see FIG. 1).

The electronic display apparatus 12 includes an electronic display module 14 which is mounted on a shelf edge 38 of a shelf 36. The display module includes the display screen 20 extending over the entire facing surface 22, end edge to end edge and top edge to bottom edge, of the display module 14.

The display module utilizes an ultra-thin and flexible plastic substrate which includes LCD, LED, organic LED, active-matrix organic LED, plasma or other similar electronic display apparatus. The electronic display module 14 is configured to provide a full-color, full-motion video, electronic display of data provided by the controller 42.

Each electronic display module 14 includes a male connector 24 mounted on one end 16 of the electronic display module 14 and electrically coupled to the display screen 20. A female connector 30 is mounted on another end 18 of the electronic display module 14 and electrically coupled to the display screen 20. Both the male and female connectors 24,30 are provided with corresponding electrical terminals for establishing the electric power and data communication. In one embodiment the male connector and female connector are formed integrally with the electronic display module substrate. In an alternative embodiment, the male and female connectors are secured to the substrate with an appropriate fastener such as screws, heat welding, adhesive, rivets, or the like. The substrate can be constructed of plastic or other engineered material which exhibits characteristics of appropriate durability, flexibility and weight for its intended use.

In a typical retail establishment, such as a large box store, products are displayed in aisle arrangements separated by walkways through which consumers move. The products 50 are displayed on the shelves 36 which are supported in structures generally referred to as gondolas 70. A gondola 70 can have any number of horizontal shelves 36 separated vertically to a height that is typically convenient for consumers to reach the products 50. A gondola 70 can be single sided or double sided depending on the specific arrangement determined by the store owner.

Although the electronic display module 14 of the present disclosure can be used individually, the preferred embodiment includes at least one additional electronic display module 40 mounted on the shelf edge 38 of the shelf 36 adjacent to the other electronic display module 14. A male connector 24 of the additional electronic display module 40 engages a female connector 30 of the other electronic display module 14 such that the display screens 20 of each electronic display module 14, 40 define a continuous display screen along the entire facing surface 22 area of the two display modules 14, 40.

As described above, the display screen 20 extends over the entire facing surface 22 of the display module. When the two electronic display modules 14, 40 are coupled together any data communicated to the electronic display modules can move or pan from one display module to the other display module in one continuous display without visual interruption. Each display module 14 can be programmed individually with the controller 42 or a plurality of adjacent display modules 14 can be programmed to provide a continuous moving display of data provided by the controller 42.

Although FIG. 1 illustrates two electronic display modules per shelf, it should be understood that any number of electronic display modules can be coupled together along a shelving system on a gondola for the entire length of a retail gondola. Typically, the shelving on retail gondolas 70 are 3 or 4 feet long but the electronic display module can be constructed in 3 or 4 foot long lengths for ease of manufacturing and installation however they can be of any convenient and suitable length as determined by the manufacturer and user.

In one embodiment, the electronic display modules will be installed in a strip channel that is fastened horizontally to the shelf edge 38 of a shelf 36 on a gondola 70. The electronic display module 14, 40 slidingly engages the strip channel and is readily removed and installed in the event that the electronic display module 14 is damaged or becomes inoperable.

In another embodiment an electronic display module, for example 4 to 6 inches in width, is mounted vertically on a retail end-cap structure or end-cap 72 of a gondola 70 to display product, pricing and promotional information.

When the two electronic display modules 14, 40 are coupled together as described above (or any number of electronic display modules coupled together) the display modules are electrically coupled in parallel. As such, if one electronic display module becomes inoperative for any reason, any remaining electronic display modules on either side of the inoperative electronic display module will continue to operate. The data and power conductors can be conventional wires extending along the length of the display module or they can be circuit traces 26 on a substrate (for example a circuit board), along the length and width of the display module.

As described above, each of the electronic display modules of the electronic display apparatus 12 are coupled to the controller 42. The controller 42 is operable for communication with each electronic display module 14, 40 with electronic power and display data provided to each electronic display module by the controller 42. It is contemplated that each gondola 70 will have its own controller 42 mounted on the gondola. However, it is also contemplated that a single controller 42 will be coupled to a plurality of gondolas as determined by the manufacturer and user of the electronic display system 10.

The controller 54 may be, for example, a microprocessor mounted on the gondola 70 or in a separate remote location. The controller 54 may also be a server coupled to an array of peripherals or a desktop computer, or a laptop computer, or a smart-phone. It is also contemplated that the controller 54 is configured to control more than one gondola 70 and may be remote from any of the gondolas 70. Communication between the controller 54 and the electronic display modules may be either by hardwire or wireless devices. The plan-o-gram database 48 and the point-of-sale database 56 may be remote from the controller 54. The controller 54 typically includes an input device 44, for example a mouse, or a keyboard, and a display device, for example a monitor screen or a smart phone. Such devices can be hardwired to the controller or connected wirelessly with appropriate software, firmware, and hardware.

The display device may also include a printer coupled to the controller 54. The display device may be configured to mail or fax or communicate electronically in other available formats and protocols reports as determined by a user. The controller 54 may be coupled to a network, for example, a local area network or a wide area network, which can be one of a hardwire network and a wireless network, for example a Bluetooth network or internet network, for example, by a WIFI connection or "cloud" connection.

The controller 54 is coupled to a database of stored plan-o-gram data 48 which resides on a plan-o-gram data device 46. The plan-o-gram data 48 includes product placement information. The controller 42 provides exact position of product shelf location 52 to at least one of the electronic display modules for display of such product information on the display screen 20 of such electronic display module. The product information typically will be the price, unit price, EPC code, and other related information as determined by the store merchant.

It should also be understood that promotional messages and information or purchase motivation to the consumer can be displayed either as a static picture or a movie clip (video clip) as determined by the store owner. It should also be understood that the controller 42 can selectively provide a message to promote a single product 50 or group of related products along the entire length of combined electronic display modules mounted on a specific gondola 70. Multiple messages that alternate or rotate in context can be displayed for a given product 50, or specific shelf 36, or specific gondola 70. All of the electronic display modules mounted on the gondola on each shelf or only a single shelf but all of the display modules can be provided with the promotional material as determined by the store owner through the controller 42.

The electronic display system 10 can also be configured to test types of demographics that are served for a specific store. For example, different price points, promotions, time of day, etc. The electronic display system 10 can also be configured to couple to peripheral equipment, for example a camera, a speaker, a microphone and recording device including appropriate software to drive and integrate the devices with the system to further support the demographic testing to determine audience measurement for advertisers.

The electronic display system 10 can also include a point-of-sale database 56 which resides on a point-of-sale database device 54 which is coupled to the controller 42. The controller 42 provides exact price of product 50 to at least one of the electronic display modules for display of such produce price information on the display screen of such electronic display module corresponding to the specific product shelf location 52.

The plan-o-gram matrix data showing where the product is located in the store and the point-of-sale database data for product information and price is uploaded to the controller 42 for communication to specific electronic display apparatus 12 on a gondola 70. The controller 42 contains the store map with numbered aisles and measured inches of shelf space on specific gondolas at specific aisles for product information display. For example, a product location of a product 50 can be addressed as "5.1.60/66" representing aisle 5, shelf no. 1, with the product display starting at 60 inches from the beginning of the shelf and ending at 66 inches on the shelf. Such address will correspond directly to the location of the product 50 on the shelf 36 of a specific gondola 70. A standard AC electrical power supply or bus will be provided to each gondola 70 to operate the controller 42 and provide power to the electronic display modules on the gondola 70.

The electronic display system 10 can also include a network 60 that couples the controller 42, the plan-o-gram database 48, and the point-of-sale database 56 together. The network 60 can be used to update product information in one of the controller 42, the plan-o-gram database 48, and the point-of-sale database 56. Such updates through the network 60 can be accomplished by the user interface 44 coupled to the controller 42 or by a point-of-sale scanner typically at a checkout location 58 as the product is checked out by an employee of the store for the consumer or by a scanner gun system 62 as product is moved on specific shelves of specific gondolas 70.

The controller 42 of the electronic display system 10 is configured to be accessible remotely via the internet, cellular, satellite or similar technology with each controller 42 having its own unique internet protocol address. Communication with the controller 42 can be done either with a hardwire system through the network 60 or wireless communication with RF, microwave, or optical communications, for example infrared transfer of data.

The controller can be configured to access really simple syndication (RSS) feeds allowing for the use of conditional triggers at the shelf edge 36. For example, conditional triggers can be used in digital signage to trigger events based on a certain set of criteria, for example an extremely hot day may trigger a sale of bottle water or an extremely cold day may trigger a price change on winter gloves. Such conditional triggers can be programmed into the controller by any of the above-described communication protocols by the store owner or through the network 60.

It is also contemplated that the retail or store owner can attach an appropriately programmed interactive touch screen info-station to the electronic display system 10 and allow customers searching for items and products 50 to locate them anywhere in the store by both showing on which aisle the item is located and literally lighting up its location on the shelf edge 36 by appropriate data being communicated to the electronic display module. The display screen 20 provided the information to the consumer based on the search criteria inputted by the consumer at the appropriate info-station.

Additional advantages of the electronic display system 10 include, but not limited to, providing more engagement with the consumer in the advertising and educational messages with full color and motion messages rather than the flat, one dimensional paper-based signage. Changes to the signs and product information is controlled by a central source (the controller 42) rather than individual replacement of paper signs at individual shelves. Price changes can be made instantly (in real time) and with 100% execution rate that will allow an increased cash flow to the retailer and also help comply with appropriate government regulations relating to pricing and related information. Advertising messages on the electronic display modules can be changed instantly (in real time) and targeted by store, product, and time of day to more closely match sales opportunities with consumers in the store searching for products 50 to be purchased. Data gathered by the controller 42 can be utilized to match with point-of-sale information to determine optimal mix of promotional pricing, messages, times of day to advertise and to test market product programs. The electronic display system 10 tends to avoid the cost of store labor required to post and remove paper signs and eliminates the human error in placing wrong signage on wrong shelves.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

The use of the terms "a" and "an" and "the" and similar referents in the context of describing the invention is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the feature and does not pose a limitation on the scope of the disclosure unless otherwise claimed. No language in the specification should be construed as indicating any non-claimed element as essential to the disclosure.

Although the foregoing description of the present system has been shown and described with reference to particular embodiments and applications thereof, it has been presented for purposes of illustration and description and is not intended to be exhaustive or to limit the electronic display system to the particular embodiments and applications disclosed. It will be apparent to those having ordinary skill in the art that a number of changes, modifications, variations, or alterations to the system as described herein may be made, none of which depart from the spirit or scope of the present disclosure. The particular embodiments and applications were chosen and described to provide the best illustration of the principles of the system and its practical application to thereby enable one of ordinary skill in the art to utilize the system in various embodiments and with various modifications as are suited to the particular use contemplated. All such changes, modifications, variations, and alterations should therefore be seen as being within the scope of the present disclosure.

What is claimed is:

1. An electronic display system comprising:
   (A) an electronic display apparatus comprising two electronic display modules (EDMs) that are mountable to a shelf edge of a shelf and connectable to each other to provide a continuous display screen of uniform height extending along a contiguous portion of the shelf edge for providing product information about products on the shelf, the two EDMs including:
      a first EDM mounted on a first part of the contiguous portion of the shelf edge, the first EDM including:
         (i) a display screen of the uniform height extending over the facing surface of the first EDM;
         (ii) a male connector mounted on one end of the first EDM and electrically coupled to the display screen; and
         (iii) a female connector mounted on another end of the first EDM and electrically coupled to the display screen; and
      at least a second EDM mounted on a second part of the contiguous portion of the shelf edge so that the second EDM is adjacent to the first EDM, the second EDM including a display screen of the uniform height;
      wherein a male connector of the second EDM engages the female connector of the first EDM such that: (i) the display screens of the first and second EDMs define the continuous display screen of the uniform height extending along the contiguous portion of the shelf edge, and (ii) a physical connection is established between the first and second EDMs that operates as a path for power transmission to provide power from the first EDM to the second EDM or from the second EDM to the first EDM, wherein the path for transmission is a parallel configuration so that when the first EDM becomes inoperative the second EDM remains operative and when the second EDM becomes inoperative the first EDM remains operative;
   (B) a controller coupled to the electronic display apparatus, the controller operable for communication with each of the first and second EDMs; and
   (C) a database of stored plan-o-gram data including product placement information indicating a product is located on the shelf, the database coupled to the controller, wherein (i) the controller receives from the database data identifying a product located on the shelf, wherein the product is identified based on the product placement information indicating that the product is located on the shelf, and (ii) the controller causes at least one of the first EDM and the second EDM to display product information for the identified product on the shelf.

2. The electronic display system of claim 1, further comprising a point-of-sale database coupled to the controller,
   wherein the controller receives from the point-of-sale database data representing a product price for the identified product on the shelf;
   wherein the product information displayed by the electronic display apparatus includes the product price for the identified product on the shelf;
   wherein the controller causes the electronic display apparatus to display the product price for the identified product on the shelf by:
      (i) causing the first EDM to display the product price when the product placement information indicates that the identified product has a product shelf location corresponding to the shelf edge on which the first EDM is mounted; and
      (ii) causing the second EDM to display the product price when the product placement information indicates that the identified product has a product shelf location corresponding to the shelf edge on which the second EDM is mounted.

3. The electronic display system of claim 2, further comprising product inventory data stored in the point-of-sale database and plan-o-gram database, wherein changes in product inventory data is communicated to the controller, in real time.

4. The electronic display system of claim 2, further comprising a network, the network coupled to the controller, the plan-o-gram database, and the point-of-sale database, wherein the network updates product information in one of the controller, the plan-o-gram database, and the point-of-sale database.

5. The electronic display system of claim 1, wherein the controller causes the first and second EDMs to display, via the continuous display screen defined by the first and second EDMs, a full-color, full-motion video electronic display according to display data provided by the controller along an array formed by the adjacent, coupled EDMs.

6. The electronic display system of claim 1, wherein the controller causes only one of the first and second EDMs to display a full-color, full-motion video electronic display according to display data provided by the controller.

7. An electronic display system comprising:
   (A) an electronic display apparatus comprising two electronic display modules (EDMs) that are mountable to a gondola edge and connectable to each other to provide a continuous display screen of uniform height extending along a contiguous portion of the gondola edge for providing product information about products on the gondola, the two EDMs including:
      a first EDM mounted on a first part of the contiguous portion of the gondola edge, the first EDM including:
         (i) a display screen of the uniform height;
         (ii) a male connector mounted on one end of the first EDM and electrically coupled to the display screen;
         (iii) a female connector mounted on another end of the first EDM and electrically coupled to the display screen; and
      at least a second EDM mounted on a second part of the contiguous portion of the gondola edge so that the second EDM is adjacent to the first EDM, the second EDM including a display screen of the uniform height;

wherein a male connector of the second EDM engages the female connector of the first EDM such that: (i) the display screens of the first and second EDMs define the continuous display screen of the uniform height extending along the contiguous portion of the gondola edge, and (ii) a physical connection is established between the first and second EDMs that operates as a path for power transmission to provide power from the first EDM to the second EDM or from the second EDM to the first EDM, wherein the path for transmission is a parallel configuration so that when the first EDM becomes inoperative the second EDM remains operative and when the second EDM becomes inoperative the first EDM remains operative;

(B) a controller coupled to the electronic display apparatus, the controller operable for communication with each of the first and second EDMs, wherein electric power and display data is provided to each of the first and second EDM; and (C) a database of stored plan-o-gram data including product placement information indicating a product is located on the gondola, the database coupled to the controller, wherein (i) the controller receives from the database data identifying a product located on the gondola, wherein the product is identified based on the product placement information indicating that the product is located on the gondola, and (ii) the controller causes at least one of the first EDM and the second EDM to display product information for the identified product on the gondola.

8. The electronic display system of claim 7, further comprising a point-of-sale database coupled to the controller, wherein the controller receives from the point-of-sale database data representing a product price for the identified product on the gondola;

wherein the product information displayed by the electronic display apparatus includes the product price for the identified product on the gondola;

wherein the controller causes the electronic display apparatus to display the product price for the identified product on the gondola by:

(i) causing the first EDM to display the product price when the product placement information indicates that the identified product has a gondola location corresponding to a gondola location where the first EDM is mounted; and (ii) causing the second EDM to display the product price when the product placement information indicates that the identified product has a gondola location corresponding to a gondola location where the second EDM is mounted.

9. The electronic display system of claim 8, further comprising product inventory data stored in the point-of-sale database and plan-o-gram database, wherein changes in the product inventory data is communicated to the controller, in real time.

10. The electronic display system of claim 8, further comprising a network, the network coupled to the controller, the plan-o-gram database, and the point-of-sale database, wherein the network updates product information in one of the controller, the plan-o-gram database, and the point-of-sale database.

11. The electronic display system of claim 7, wherein the controller causes the first and second EDMs to display, via the continuous display screen defined by the first and second EDMs, a full-color, full-motion video electronic display according to display data provided by the controller along an array formed by the adjacent, coupled EDMs.

12. The electronic display system of claim 7, wherein the controller causes only one of the first and second EDMs to display a full-color, full-motion video electronic display according to display data provided by the controller.

13. The electronic display system of claim 7, wherein the first and second EDMs are each mounted on a shelf edge of a shelf of the gondola.

14. The electronic display system of claim 7, wherein the first and second EDMs are each mounted vertically on an end-cap of the gondola.

15. A method of promoting retail products on a shelf in a retail store, the method comprising:

attaching to a shelf edge of a shelf an electronic display apparatus comprising two electronic display modules (EDMs) that are shelf mountable and connectable to each other to provide a continuous display screen of uniform height extending along a contiguous portion of the shelf edge for providing product information about products on the shelf, by:

(A) attaching a first EDM to a first part of the contiguous portion of the shelf edge, the first EDM including a display screen of uniform height extending over the facing surface of the first EDM; and (B) attaching a second EDM to a second part of the contiguous portion of the shelf edge immediately adjacent to the first EDM, the second EDM including a display screen of the uniform height extending over the facing surface of the second EDM;

coupling an end of each EDM together such that a physical connection is established between the first and second EDMs that operates as a path for power transmission to provide power from the first EDM to the second EDM or from the second EDM to the first EDM, wherein the first and second EDM are in physical proximity such that the display screens of the first and second EDMs define the continuous display screen of the uniform height extending along the contiguous portion of the shelf edge; and coupling each of the first EDM and the second EDM to a controller, the controller operable for communication with each of the first and second EDM;

receiving at the controller data identifying a product located on the shelf, wherein the received data is received from a database of stored plan-o-gram data including product placement information, wherein the product is identified based on the product placement information indicating that the product is located on the shelf; and based on the display data: displaying at the first EDM, the second EDM, or both the first and second EDM, product information for a product on the shelf.

16. The method of promoting retail products on a shelf of claim 15, further comprising:

coupling a plan-o-gram database and point-of-sale database to the controller, wherein the controller receives from the point-of-sale database data representing a product price for the product on the shelf;

wherein the displayed product information includes the product price for the product on the shelf; and wherein displaying, by at least one of the first and second EDMs, the product price for the product on the shelf includes:

(i) when product placement information stored at the plan-o-gram database indicates that the product on the shelf has a product shelf location corresponding to the shelf edge where the first EDM is mounted: displaying, by the first EDM, the product price; and (ii) when product placement information stored at the plan-o-gram database indicates that the product on the shelf has a product shelf location corresponding to the shelf edge where the second EDM is mounted: displaying, by the second EDM, the product price.

17. The method of promoting retail products on a shelf of claim 16, further comprising: coupling the controller to a network, wherein the network updates product information in one of the controller, the plan-o-gram database, and the point-of-sale database.

18. The method of promoting retail products on a shelf of claim 15, wherein the shelf is a shelf of a gondola, and wherein attaching the first EDM to the first part of the contiguous portion of the shelf edge and attaching the second EDM to the second part of the contiguous portion of the shelf edge comprises: mounting the first and second EDMs on the shelf edge of the shelf of the gondola.

19. The method of promoting retail products on a shelf of claim 15, wherein the shelf is an end-cap shelf for a gondola, and wherein attaching the first EDM to the first part of the contiguous portion of the shelf edge and attaching the second EDM to the second part of the contiguous portion of the shelf edge comprises: mounting the first and second EDMs on the end-cap shelf of the gondola.

20. The method of promoting retail products on a shelf of claim 15, further comprising: configuring each of the first and second EDMs to display a full-color, full-motion video electronic display of data provided by the controller along the entire array of adjacent, coupled EDMs.

\* \* \* \* \*